United States Patent
Takahashi et al.

(10) Patent No.: US 8,688,300 B2
(45) Date of Patent: Apr. 1, 2014

(54) HYBRID VEHICLE AND CONTROL METHOD THEREOF

(75) Inventors: Shigenori Takahashi, Anjyo (JP); Mitsuhiro Tsuchiya, Takahama (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 969 days.

(21) Appl. No.: 12/588,996

(22) Filed: Nov. 4, 2009

(65) Prior Publication Data

US 2010/0121512 A1  May 13, 2010

(30) Foreign Application Priority Data

Nov. 7, 2008 (JP) ................. 2008-286872

(51) Int. Cl.
*B60L 9/00* (2006.01)
(52) U.S. Cl.
USPC ....... 701/22; 477/4; 477/5; 477/906; 477/907
(58) Field of Classification Search
USPC .................. 701/22; 477/4, 5, 906, 907; 475/5
See application file for complete search history.

(56) References Cited

U.S. PATENT DOCUMENTS

| 2001/0022166 A1* | 9/2001 | Yamaguchi et al. | ....... 123/179.3 |
| 2006/0100057 A1* | 5/2006 | Severinsky et al. | ............... 477/4 |

FOREIGN PATENT DOCUMENTS

| JP | 2003032805 A | * | 1/2003 |
| JP | A-2003-32805 | | 1/2003 |

* cited by examiner

*Primary Examiner* — John Q Nguyen
*Assistant Examiner* — Rodney P King
(74) *Attorney, Agent, or Firm* — Oliff PLC (57) ABSTRACT

The invention provides a hybrid vehicle and a control method thereof with which, in a case where a vehicle speed V obtained by a vehicle speed sensor equals or exceeds a first determination vehicle speed V1 at a time of occurrence of an internal combustion engine-related abnormality, which is when an abnormality relating to motors MG1 and MG2 is determined not to have occurred but an abnormality relating to an engine is determined to have occurred while the engine is operative, the motors MG1 and MG2 are controlled such that traveling torque is output to a ring gear shaft serving as a drive shaft from the motor MG2 while the engine is motored by the motor MG1 such that a crankshaft rotates at a target rotation speed until the vehicle speed V subsequently falls to or below a second determination vehicle speed V2.

9 Claims, 6 Drawing Sheets

HYBRID VEHICLE AND CONTROL METHOD THEREOF

The disclosure of Japanese Patent Application No. 2008-286872, filed on Nov. 7, 2008, including the specification, drawings and abstract is incorporated herein by reference in its entirety.

BACKGROUND OF THE INVENTION

1. Field of the Invention

The invention relates to a hybrid vehicle and a control method thereof.

2. Description of the Related Art

A conventional hybrid vehicle includes an engine, a planetary gear mechanism including a planetary gear that is connected to a crankshaft of the engine, a first motor connected to a sun gear of the planetary gear mechanism and capable of generating power, a second motor capable of outputting power to a ring gear shaft that serves as a drive shaft connected to a ring gear of the planetary gear mechanism, and a battery capable of exchanging power with the first and second motors (see Japanese Patent Application Publication No. 2003-32805 (JP-A-2003-32805), for example). In this hybrid vehicle, when an abnormality occurs in a second central processing unit (CPU) that controls the second motor, the second motor is controlled by a first CPU that controls the first motor, and therefore both the first and second motors can be driven to execute evasive travel when an abnormality occurs.

In a hybrid vehicle such as that described above, when an abnormality occurs in the engine or in a sensor, an accessory or the like related to the engine while the engine is operative, as long as the second motor and accessories related thereto are normal, the hybrid vehicle can be allowed to continue traveling by gate-blocking an inverter that drives the motor MG1 such that the engine is stopped and power is output to the drive shaft from the second motor. However, when the engine is stopped suddenly due to an abnormality relating to the engine while the engine is operative and the hybrid vehicle is traveling at a comparatively high speed, a rotation speed of the engine may decrease more rapidly than the vehicle speed, while respective rotation speeds of the sun gear of the planetary gear mechanism and the first motor connected thereto may increase rapidly in an opposite direction to a previous direction. As a result of these sudden rotation speed changes, a problem, or in other words a secondary malfunction, may occur in the planetary gear mechanism and so on, which have been operating normally up to this point.

SUMMARY OF THE INVENTION

In consideration of the problems described above, the invention provides a hybrid vehicle and a control method thereof, with which the hybrid vehicle can be allowed to continue traveling while suppressing secondary malfunctions when an abnormality relating to an internal combustion engine occurs.

According to one aspect of the invention, a hybrid vehicle including: an internal combustion engine; a first motor capable of inputting and outputting power; a planetary gear mechanism that includes a first element connected to a rotary shaft of the first motor, a second element connected to an engine shaft of the internal combustion engine, and a third element connected to a drive shaft that transmits power to a drive wheel, the second element being positioned between the first element and the third element on a collinear diagram and the three elements being capable of mutual differential rotation; a second motor capable of outputting power to the drive shaft; a storage device capable of exchanging power with the first and second motors; an abnormality determination device that determines the presence of an abnormality relating to the internal combustion engine and determines the presence of an abnormality relating to the first motor and the presence of an abnormality relating to the second motor; a vehicle speed acquisition device that obtains a vehicle speed; and a controller that executes normal evasive electric travel control, in which a traveling power is output to the drive shaft from the second motor while the internal combustion engine is halted, when the vehicle speed obtained by the vehicle speed acquisition device is lower than a predetermined vehicle speed at a time of at a time of occurrence of an internal combustion engine-related abnormality, which is when the abnormality determination device determines that an abnormality relating to the first and second motors has not occurred but an abnormality relating to the internal combustion engine has occurred while the internal combustion engine is operative, and executes high vehicle speed evasive electric travel control, in which the traveling power is output to the drive shaft from the second motor while the internal combustion engine is motored by the first motor such that the engine shaft rotates at a predetermined target rotation speed until a predetermined cancellation condition is established, when the vehicle speed obtained by the vehicle speed acquisition device equals or exceeds the predetermined vehicle speed at a time of occurrence of an internal combustion engine-related abnormality, is provided.

According to the hybrid vehicle described above, when the vehicle speed obtained by the vehicle speed acquisition device is lower than the predetermined vehicle speed at a time of occurrence of an internal combustion engine-related abnormality, or in other words when an abnormality relating to the first and second motors is determined not to have occurred but an abnormality relating to the internal combustion engine is determined to have occurred while the internal combustion engine is operative, normal evasive electric travel control is executed to output traveling power to the drive shaft from the second motor while the internal combustion engine is halted. When the vehicle speed obtained by the vehicle speed acquisition device equals or exceeds the predetermined vehicle speed at a time of occurrence of an internal combustion engine-related abnormality, on the other hand, high vehicle speed evasive electric travel control is executed to output traveling power to the drive shaft from the second motor while the internal combustion engine is motored by the first motor such that the engine shaft rotates at the predetermined target rotation speed until the predetermined cancellation condition is established. In other words, when an abnormality relating to the internal combustion engine occurs, the rotation speed of the internal combustion engine can be controlled by operating the first motor normally as long as an abnormality relating to the first and second motors has not occurred. When the vehicle speed equals or exceeds the predetermined vehicle speed at a time of occurrence of an internal combustion engine-related abnormality, a rapid rotation speed reduction (rotation speed variation) in the internal combustion engine from a high vehicle speed state can be suppressed by motoring the internal combustion, engine using the first motor such that the engine shaft rotates at the predetermined target vehicle speed, and as a result, problems in the planetary gear mechanism and so on caused by rapid variation in the rotation speed of the internal combustion engine, a rapid increase to a reverse rotation side in the rotation speeds of the first element of the planetary gear mechanism and the first motor connected thereto, and so on can be suppressed favorably. Hence, in this hybrid vehicle, when an abnormality relating to the internal combustion engine occurs, the hybrid vehicle can be allowed to continue traveling while suppressing secondary malfunctions.

In this case, the target rotation speed may be set in accordance with the vehicle speed obtained by the vehicle speed acquisition device to decrease steadily as the obtained vehicle speed decreases. In so doing, the internal combustion engine can be motored so as to suppress rapid rotation speed reductions in the engine shaft while the power consumed by the first motor during the motoring can be suppressed.

Further, the cancellation condition may be established when the vehicle speed obtained by the vehicle speed acquisition device falls to or below a predetermined motoring cancellation vehicle speed which is lower than the predetermined vehicle speed. In other words, once the vehicle speed of the hybrid vehicle has decreased to a certain extent due to execution of the high vehicle speed evasive electric travel control, the reduction rate (variation rate) of the rotation speed of the engine shaft decreases and the likelihood of the rotation speeds of the first element of the planetary gear mechanism and the first motor connected thereto increasing rapidly to the reverse rotation side decreases, even when motoring of the internal combustion engine is stopped. Hence, by halting motoring of the internal combustion engine when the vehicle speed falls to or below the motoring cancellation vehicle speed after the start of the high vehicle speed evasive electric travel control, the power that is consumed by the first motor during the motoring can be eliminated, and travel using power from the second motor can be continued as far as possible.

Further, when the cancellation condition is established, the controller may cause the first motor to output a negative power to the engine shaft of the internal combustion engine to stop rotation of the engine shaft. In so doing, power generated by the first motor while halting rotation of the engine shaft can be used to charge the storage device or added to power output from the second motor, while the negative power from the first motor can be reversed by the planetary gear mechanism and output to the drive shaft as positive traveling power. Thus, travel using power from the second motor can be continued as far as possible.

Further, the planetary gear mechanism may be a single pinion planetary gear mechanism including a sun gear connected to the rotary shaft of the first motor, a ring gear connected to the drive shaft, and a carrier that holds a plurality of pinions that mesh with both the sun gear and the ring gear and is connected to the engine shaft of the internal combustion engine. In a hybrid vehicle including this type of single pinion planetary gear mechanism, the rotation speed of the pinions held by the carrier is commensurate with a difference between the rotation speed of the carrier, which matches the rotation speed of the internal combustion engine, and the rotation speed of the ring gear, which is commensurate with the vehicle speed. Hence, with this type of hybrid vehicle, by motoring the internal combustion engine using the first motor such that the engine shaft rotates at the predetermined target rotation speed when the vehicle speed equals or exceeds the predetermined vehicle speed at a time of occurrence of an internal combustion engine-related abnormality, overspeeding of the pinions caused by a rapid rotation speed reduction (rotation speed variation) in the internal combustion engine from a high vehicle speed state can be suppressed, and as a result, problems in the planetary gear mechanism and so on caused by overspeeding of the pinions can be suppressed favorably.

According to another aspect of the invention, a control method for a hybrid vehicle that includes an internal combustion engine, a first motor capable of inputting and outputting power, a planetary gear mechanism that includes a first element connected to a rotary shaft of the first motor, a second element connected to an engine shaft of the internal combustion engine, and a third element connected to a drive shaft that transmits power to a drive wheel, the second element being positioned between the first element and the third element on a collinear diagram and the three elements being capable of mutual differential rotation, a second motor capable of outputting power to the drive shaft, and a storage device capable of exchanging power with the first and second motors, is provided, the method including: (a) a step of determining the presence of an abnormality relating to the internal combustion engine and determining the presence of an abnormality relating to the first motor and the presence of an abnormality relating to the second motor; and (b) a step of executing normal evasive electric travel control, in which a traveling power is output to the drive shaft from the second motor while the internal combustion engine is halted, when a vehicle speed is lower than a predetermined vehicle speed at a time of occurrence of an internal combustion engine-related abnormality, which is when the determinations of the step (a) indicate that an abnormality relating to the first and second motors has not occurred but an abnormality relating to the internal combustion engine has occurred while the internal combustion engine is operative, and executing high vehicle speed evasive electric travel control, in which the traveling power is output to the drive shaft from the second motor while the internal combustion engine is motored by the first motor such that the engine shaft rotates at a predetermined target rotation speed until a predetermined cancellation condition is established, when the vehicle speed equals or exceeds the predetermined vehicle speed at a time of occurrence of an internal combustion engine-related abnormality.

According to the control method for a hybrid vehicle described above, a rapid rotation speed reduction (rotation speed variation) in the internal combustion engine from a high vehicle speed state can be suppressed by motoring the internal combustion engine using the first motor such that the engine shaft rotates at the predetermined target rotation speed when the vehicle speed equals or exceeds the predetermined vehicle speed upon the occurrence of an internal combustion engine-related abnormality, and therefore problems in the planetary gear mechanism and so on caused by rapid variation in the rotation speed of the internal combustion engine, a rapid increase to a reverse rotation side in the rotation speeds of the first element of the planetary gear mechanism and the first motor connected thereto, and so on can be suppressed favorably. Hence, according to this method, when an abnormality relating to the internal combustion engine occurs, the hybrid vehicle can be allowed to continue traveling while suppressing secondary malfunctions.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
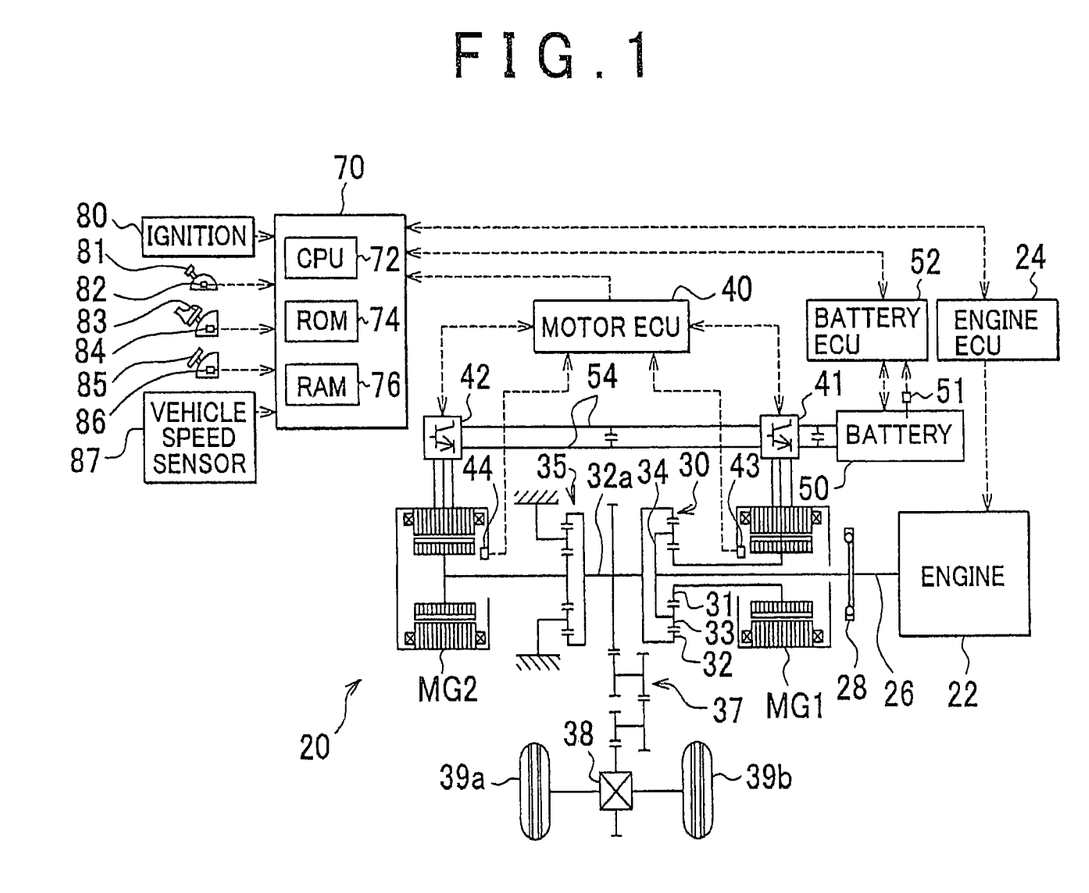
FIG. 1 is a schematic diagram showing a hybrid automobile serving as a hybrid vehicle according to an embodiment of the invention.

Next, an embodiment of the invention will be described. FIG. 1 is a schematic diagram showing a hybrid automobile 20 serving as a hybrid vehicle according to an embodiment of the invention. The hybrid automobile 20 shown in the drawing includes an engine 22, a triaxial power distribution integration mechanism 30 connected to a crankshaft (engine shaft) 26 of the engine 22 via a damper 28, a motor MG1 connected to the power distribution integration mechanism 30 and capable of generating power, a reduction gear 35 coupled to a ring gear shaft 32a that serves as a drive shaft and is connected to the power distribution integration mechanism 30, a motor MG2 connected to the reduction gear 35, a hybrid ECU 70 that controls the entire hybrid automobile 20, and so on.

The engine 22 is an internal combustion engine that outputs power upon reception of a supply of hydrocarbon-based fuel such as gasoline or light oil, and is subjected to control such as fuel injection amount control, ignition timing control, and intake air amount control by an engine ECU 24. Signals from various sensors provided in relation to the engine 22 in order to detect operating conditions of the engine 22, such as a crank position sensor that detects a crank position of the crankshaft 26, for example, are input into the engine ECU 24. The engine ECU 24 communicates with the hybrid ECU 70 to control operations of the engine 22 on the basis of control signals from the hybrid ECU 70, signals from the above sensors, and so on, and transmit data indicating the operational state of the engine 22 itself as well as the operational states of the various sensors and accessories to the hybrid ECU 70.

The power distribution integration mechanism 30 is a single pinion planetary gear mechanism including an external sun gear 31, an internal ring gear 32 disposed concentrically with the sun gear 31, a plurality of pinions 33 that mesh with the sun gear 31 and mesh with the ring gear 32, and a carrier 34 that holds the plurality of pinions 33 to be free to spin and revolve, wherein the carrier 34 is positioned between the sun gear 31 and the ring gear 32 on a collinear diagram and these three elements are capable of mutual differential rotation. A rotary shaft of the motor MG1 is coupled to the sun gear 31, which serves as a first element of the power distribution integration mechanism 30. The crankshaft 26 of the engine 22 is coupled to the carrier 34, which serves as a second element.

A rotary shaft of the motor MG2 is coupled to the ring gear 32, which serves as a third element, via the ring gear shaft 32a and the reduction gear 35. When the motor MG1 functions as a generator, the power distribution integration mechanism 30 distributes power from the engine 22, which is input from the carrier 34, to the sun gear 31 side and the ring gear 32 side in accordance with a gear ratio thereof, and when the motor MG1 functions as a motor, the power distribution integration mechanism 30 integrates the power from the engine 22 input from the carrier 34 with power from the motor MG1 input from the sun gear 31 and outputs the integrated power to the ring gear 32 side. The power output to the ring gear 32 is ultimately output to vehicle wheels 39a, 39b serving as drive wheels from the ring gear shaft 32a via a gear mechanism 37 and a differential gear 38.

The motor MG1 and the motor MG2 are both constituted by available synchronous generator-motors capable of operating as both a generator and a motor, and are used to exchange power with a battery 50 serving as a secondary battery via inverters 41, 42. A power line 54 connecting the inverters 41, 42 and the battery 50 is constituted by a positive electrode bus and a negative electrode bus shared by the inverters 41, 42 such that power generated by one of the motors MG1, MG2 can be consumed by the other motor. Hence, the battery 50 is charged by power generated in one of the motors MG1, MG2 and discharged to make up for a power deficiency in the motors MG1, MG2, and when a power balance is achieved between the motors MG1, MG2, the battery 50 is not subjected to charging and discharging. The motors MG1, MG2 are both drive-controlled by a motor ECU 40. Signals required to drive-control the motors MG1, MG2, for example signals from rotation position detection sensors 43, 44 that detect the rotation positions of respective rotors of the motors MG1, MG2, a phase current applied to the motors MG1, MG2, which is detected by a current sensor not shown in the drawing, and so on, are input into the motor ECU 40, and the motor ECU 40 outputs a switching control signal and so on to the inverters 41, 42. In this embodiment, one-phase excitation two-phase output resolvers are employed as the rotation position detection sensors 43, 44, and the motor ECU 40 executes a rotation speed calculation routine, not shown in the drawings, at predetermined time intervals (predetermined sampling intervals) to calculate rotation speeds Nm1, Nm2 of the respective rotors of the motors MG1, MG2 on the basis of signals from the rotation position detection sensors 43, 44. Further, the motor ECU 40 communicates with the hybrid ECU 70 to drive-control the motors MG1, MG2 on the basis of control signals and so on from the hybrid ECU 70 and transmit data indicating the operational states of the motors MG1, MG2 themselves and data indicating the operational states of drive circuits for driving the motors MG1, MG2, such as the inverters 41, 42 and a boost converter not shown in the drawing, and various sensors to the hybrid ECU 70.

The battery 50 is constituted by a nickel hydrogen secondary battery or a lithium ion secondary battery, and is managed by a battery ECU 52. Signals required to manage the battery 50, for example an inter-terminal voltage from a voltage sensor, not shown in the drawing, disposed between terminals of the battery 50, a charge/discharge current from a current sensor, not shown in the drawing, attached to the power line 54 connected to an output terminal of the battery 50, a battery temperature Tb from a temperature sensor 51 attached to the battery 50, and so on, are input into the battery ECU 52. Further, if necessary, the battery ECU 52 transmits data relating to the state of the battery 50 to the hybrid ECU 70 and the engine ECU 24 through communication. The battery ECU 52 according to this embodiment calculates a state of charge (SOC) on the basis of an integrated value of the charge/discharge current detected by the current sensor for managing the battery 50, calculates a charge/discharge required power Pb* of the battery 50 on the basis of the state of charge SOC, and calculates an input limit Win that serves as an allowable charge power, or in other words an allowable power for charging the battery 50, and an output limit Wout that serves as an allowable discharge power, or in other words an allowable power for discharging the battery 50, on the basis of the state of charge SOC and the battery temperature Tb. Note that the input and output limits Win, Wout of the battery 50 may be set by setting basic values of the input and output limits Win, Wout on the basis of the battery temperature Tb, setting an input limit correction coefficient and an output limit correction coefficient on the basis of the state of charge (SOC) of the battery 50, and multiplying the correction coefficients by the set basic values of the input and output limits Win, Wout.

The hybrid ECU 70 is constituted by a microprocessor centering on a CPU 72. In addition to the CPU 72, the microprocessor includes a read only memory (ROM) 74 storing a processing program and so on, a random access memory (RAM) 76 that stores data temporarily, input/output ports and a communication port, not shown in the drawings, and so on. An ignition signal from an ignition switch (start switch) 80, a shift range SR from a shift range sensor 82 that detects the shift range SR corresponding to an operation position (shift position) of a shift lever 81, an accelerator opening Acc from an accelerator pedal position sensor 84 that detects a depression amount of an accelerator pedal 83, a brake pedal stroke BS from a brake pedal stroke sensor 86 that detects a depression amount of a brake pedal 85, a vehicle speed V from a vehicle speed sensor 87, and so on are input into the hybrid ECU 70 via the input port. Further, as noted above, the hybrid ECU 70 is connected to the engine ECU 24, motor ECU 40, battery ECU 52, and so on via the communication port in order to exchange various control signals and data with the engine ECU 24, motor ECU 40, battery ECU 52, and so on. Furthermore, the hybrid ECU 70 determines the presence of an abnormality relating to the engine 22 on the basis of the data transmitted from the engine ECU 24 indicating the operational state of the engine 22 and the operational states of the various sensors and accessories, and determines the presence of an abnormality relating to the motor MG1 and the motor MG2 on the basis of the data indicating the operational states of the motors MG1, MG2, the drive circuits for driving the motors MG1, MG2, i.e. the inverters 41, 42 and the boost converter not shown in the drawings, and the various sensors. When the hybrid ECU 70 determines that an abnormality relating to the engine 22, or more specifically an abnormality relating to the engine 22 itself, the engine ECU 24, or the various sensors and accessories related to the engine. 22, has occurred or determines that an abnormality relating to the motors MG1, MG2, or more specifically an abnormality relating to the motors MG1, MG2 themselves, the motor ECU 40, the drive circuits such as the inverters 41, 42, or the various sensors related thereto, has occurred, the hybrid ECU 70 illuminates a predetermined warning lamp on an instrument panel and executes predetermined evasive travel control.

In the hybrid automobile 20 according to the embodiment described above, a required torque Tr* to be output to the ring gear shaft 32a serving as the drive shaft that is coupled to the vehicle wheels 39a, 39b serving as the drive wheels is calculated by the hybrid ECU 70 on the basis of the accelerator opening Acc corresponding to the depression amount of the accelerator pedal 83 by the driver and the vehicle speed V, whereupon the engine 22 is controlled by the engine ECU 24 and the motors MG1 and MG2 are respectively controlled by the motor ECU 40 such that a torque based on the required torque Tr* is output to the ring gear shaft 32a. Operation control modes of the engine 22 and the motors MG1 and MG2 include a torque conversion operating mode in which the engine 22 is operation-controlled such that power corresponding to the required torque Tr* is output from the engine 22 and the motors MG1 and MG2 are drive-controlled such that all of the power output from the engine 22 is subjected to torque conversion by the power distribution integration mechanism 30 and the motors MG1 and MG2 and then output to the ring gear shaft 32a, a charge/discharge operating mode in which the engine 22 is operation-controlled such that power corresponding to a sum total of the required torque Tr* and power required to charge/discharge the battery 50 is output from the engine 22 and the motors MG1 and MG2 are drive-controlled such that in accordance with charging/discharging of the battery 50, all or a part of the power output from the engine 22 is subjected to torque conversion by the power distribution integration mechanism 30 and the motors MG1 and MG2 and a torque based on the required torque Tr* is output to the ring gear shaft 32a, a motor operating mode in which the operation of the engine 22 is stopped and the motor MG2 is drive-controlled such that a torque based on the required torque Tr* is output to the ring gear shaft 32a, and so on. Further, the evasive travel control executed by the hybrid ECU 70 includes evasive direct travel control, which is executed when the engine 22 and the motor MG1 can be operated normally, evasive motor travel control, which is executed when the motor MG2 can be operated normally, and so on. In the evasive direct travel control, the inverter 42 for the motor MG2 is set in a gate-blocked state and negative torque from the motor MG1 is reversed by the power distribution integration mechanism 30 and output to the ring gear shaft 32a as positive travel torque while a reaction force is received by the engine 22. Further, in evasive motor travel control, positive travel torque is output to the ring gear shaft 32a from the motor MG2 while the operation of the engine 22 is basically stopped.

Next, an operation of the hybrid automobile 20 according to this embodiment, in particular an operation of the hybrid automobile 20 when evasive motor travel control is executed by the hybrid ECU 70, will be described.

Figure 2A:
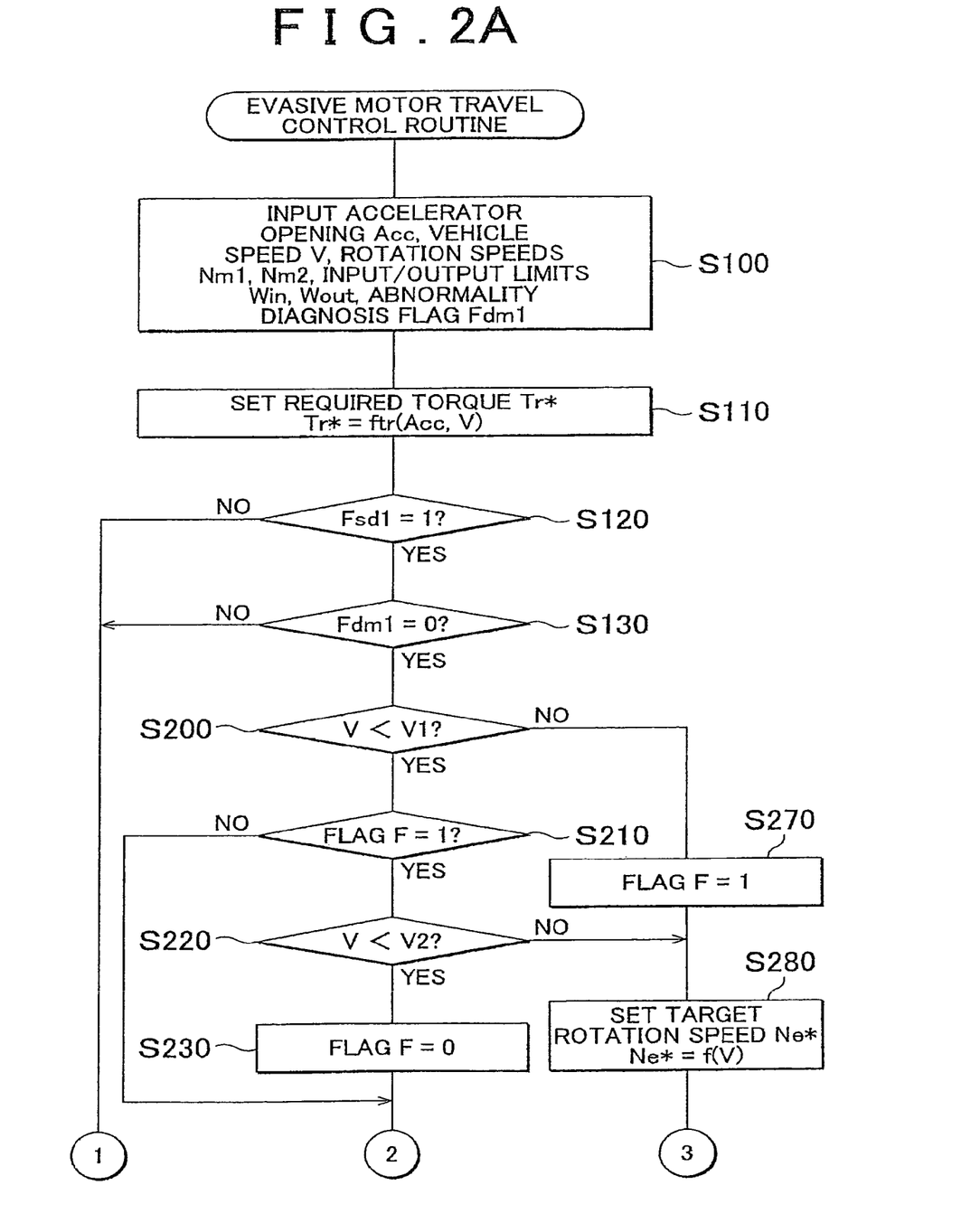
FIG. 2A and FIG. 2B are flowcharts showing an example of an evasive motor travel control routine executed by a hybrid electric control unit (to be referred to be "ECU" hereafter) according to this embodiment.
Figure 2B:
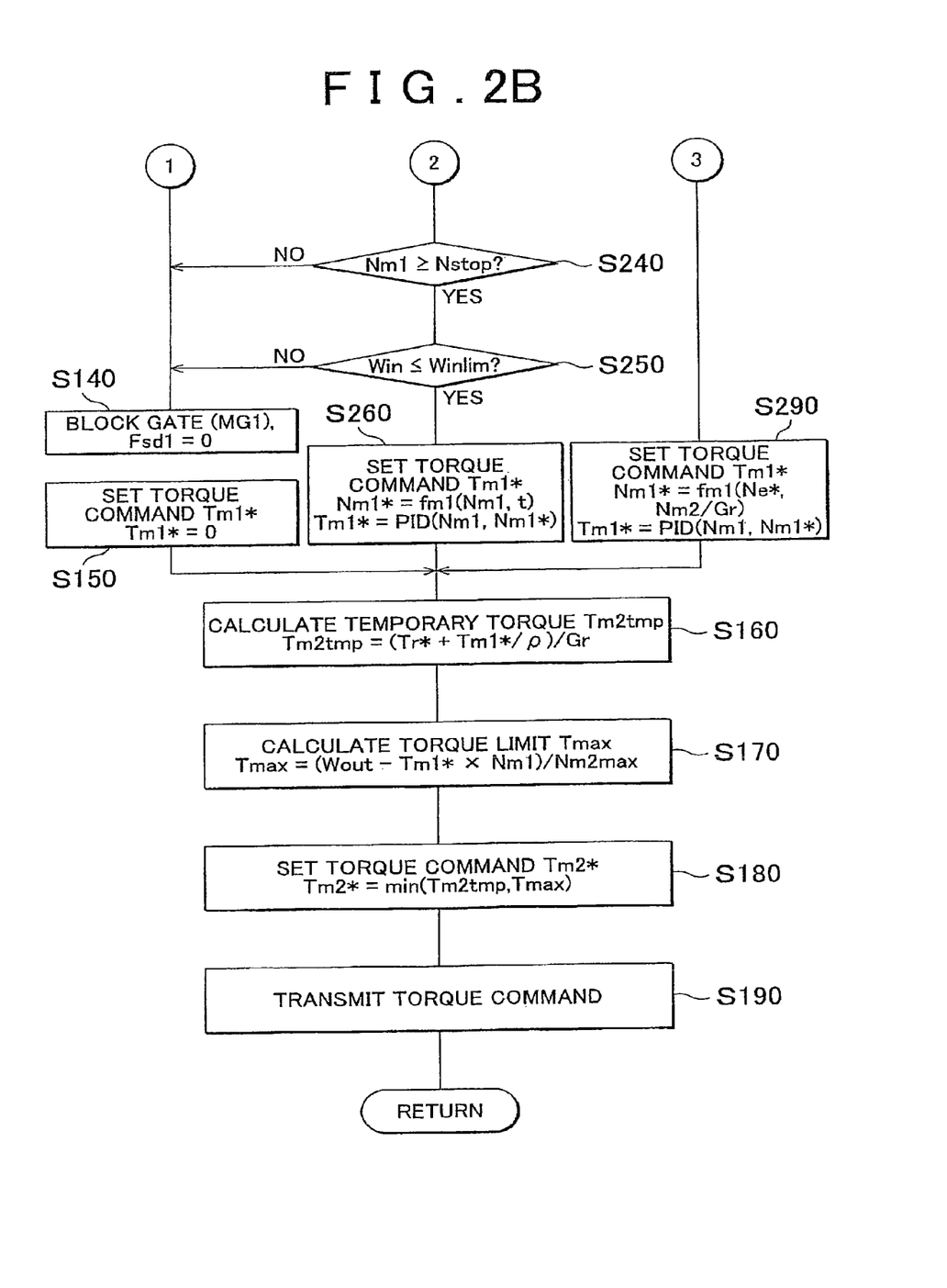

FIG. 2A and FIG. 2B are flowcharts showing an example of an evasive motor travel control routine which is executed repeatedly by the hybrid ECU 70 at predetermined time intervals (of several milliseconds (msec), for example) when the hybrid ECU 70 determines that an abnormality relating to the motor MG2 has not occurred but an abnormality relating to the engine 22 or an abnormality relating to the motor MG1 has occurred while the engine 22 is operative. Note that when the hybrid ECU 70 determines that an abnormality relating to the engine 22 or an abnormality relating to the motor MG1 has occurred, fuel injection control (fuel supply), ignition timing control, and so on in the engine 22 are stopped at that stage.

At the beginning of the evasive motor travel control routine shown in FIG. 2A, the CPU 72 of the hybrid ECU 70 executes processing to input data required for the control, namely the accelerator opening Acc from the accelerator pedal position sensor 84, the vehicle speed V from the vehicle speed sensor 87, the rotation speeds Nm1, Nm2 of the motors MG1, MG2, the input and output limits Win, Wout of the battery 50, and a value of an abnormality diagnosis flag Fdm1 (step S100). Here, the rotation speeds Nm1, Nm2 of the motors MG1, MG2 are calculated by the motor ECU 40 in a rotation speed calculation routine and input from the motor ECU 40 by communication. Further, the input and output limits Win; Wout are input from the battery ECU 52 by communication. The abnormality diagnosis flag Fdm1 is set at a value of 0 by the hybrid ECU 70 after determining that an abnormality relating to the motor MG1 has not occurred and set at a value of 1 by the hybrid ECU 70 after determining that an abnormality relating to the motor MG1 has occurred.

Figure 3:
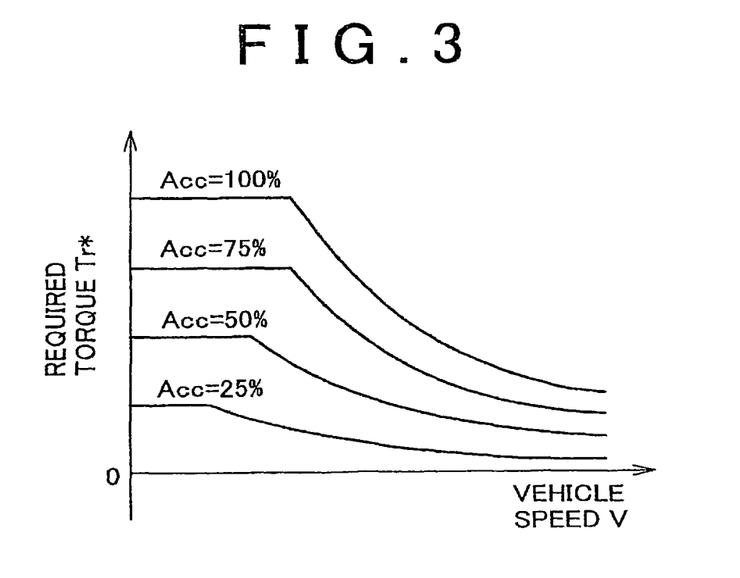
FIG. 3 is an illustrative view showing an example of a required torque setting map used in this embodiment.

Following the data input processing in step S100, the required torque Tr* to be output to the ring gear shaft 32a coupled to the vehicle wheels 39a, 39b is set on the basis of the accelerator opening Acc and the vehicle speed V (step S110). In this embodiment, a relationship between the accelerator opening Acc, the vehicle speed V, and the required torque Tr* is determined in advance and stored in the ROM 74 as a required torque setting map, and a torque value corresponding to the given accelerator opening Acc and vehicle speed V is derived from the map and set as the required torque Ti.* FIG. 3 shows an example of the required torque setting map. Next, a determination is made as to whether or not a gate blocking flag Fsd1, which is set at a value of 1 when the inverter 41 for the motor MG1 is not gate-blocked and set at a value of 0 when the inverter 41 is gate-blocked, is at a value of 1, or in other words whether or not the inverter 41 is gate-blocked (step S120). When the inverter 41 is not gate-blocked, a determination is made as to whether or not the abnormality diagnosis flag Fdm1 input in step S100 is at a value of 1, or in other words whether or not an abnormality relating to the motor MG1 has occurred (step S130). When the abnormality diagnosis flag Fdm1 is at a value of 1, or in other words when it is determined that an abnormality relating to the motor MG1 has occurred, a rotation speed Ne of the engine 22 cannot be controlled by the motor MG1, and therefore a command signal is transmitted to the motor ECU 40 to gate-block the inverter 41 for the motor MG1 and the gate blocking flag Fsd1 is set at a value of 0 (step S140).

When the inverter 41 is gate-blocked in step S140, a torque command Tm1* relating to the motor MG1 is controlled to a value of 0 (step S150), whereupon the required torque Tr*, the torque command Tm1* (at a value of 0 here), a gear ratio ρ of the power distribution integration mechanism 30, and a gear ratio Gr of the reduction gear 35 are used to calculate a temporary motor torque Tm2tmp, which is a temporary value of a torque to be output from the motor MG2, in accordance with a following Equation (1) (step S160). Further, the output limit Wout of the battery 50, the torque command Tm1* relating to the motor MG1 (at a value of 0 here), the current rotation speed Nm1 of the motor MG1, and a predetermined upper limit rotation speed Nm2max of the motor MG2 are used to calculate a torque limit Tmax serving as an upper limit of the torque that may be output from the motor MG2 in accordance with a following Equation (2) (step S170). Here, in the hybrid automobile 20 according to this embodiment, an upper limit value of the vehicle speed when evasive motor travel control is executed by the hybrid ECU 70 is determined in advance (at approximately 30 to 40 km/h in this embodiment, for example), and therefore a value obtained by converting the upper limit value of the vehicle speed into a rotation speed of the motor MG2 is used as the upper limit rotation speed Nm2max. Next, the smaller of the temporary motor torque Tm2tmp and the torque limit Tmax is set as a torque command Tm2* relating to the motor MG2 (step S180). By setting the torque command Tm2* relating to the motor MG2 in this manner, the torque to be output to the ring gear shaft 32a can be limited to a range determined by the output limit Wout of the battery 50 and the upper limit rotation speed Nm2max (the upper limit value of the vehicle speed). Once the torque command Tm2* relating to the motor MG2 has been set in this manner, the torque command Tm2* for the motor MG2 (as well as the torque command Tm1* for the motor MG1) is transmitted to the motor ECU 40 (step S190), whereupon the processing in step S100 onward is executed again. Upon reception of the torque command Tm2*, the motor ECU 40 performs switching control on a switching element of the inverter 42 such that the motor MG2 is driven in accordance with the torque command Tm2*. When the processing in step S100 onward is executed again, the gate blocking flag Fsd1 is determined to be at a value of 0 in step S120, and therefore the processing in steps S140 to S190 is repeated thereafter. Hence, when it is determined that an abnormality relating to at least the motor MG1 has occurred, the inverter 41 for the motor MG1 is gate-blocked, whereby the engine 22 is stopped and traveling torque is output from the motor MG2 to the ring gear shaft 32a, and as a result, the hybrid automobile 20 can continue to travel.

$$Tm2tmp=(Tr^*+Tm1^*/\rho)/Gr \quad (1)$$

$$Tmax=(Wout-Tm1^* \times Nm1)/Nm2max \quad (2)$$

Figure 4:
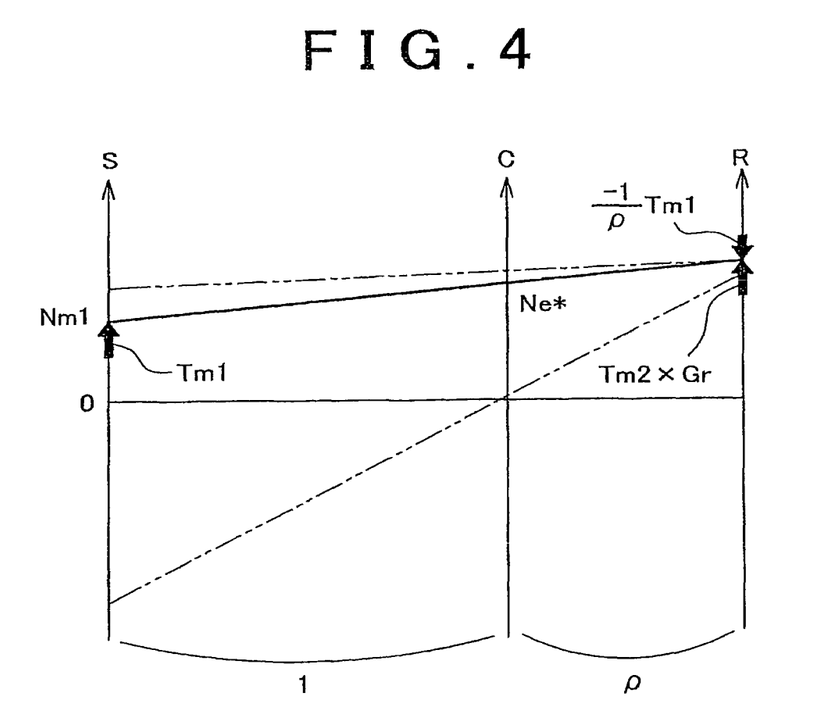
FIG. 4 is an illustrative view showing an example of a collinear diagram showing a mechanical relationship between a rotation speed and a torque of rotary elements in a power distribution integration mechanism according to this embodiment.

Meanwhile, when it is determined in step S130 that the abnormality diagnosis flag Fdm1 is at a value of 0, it is determined that although an abnormality relating to the motor MG1 has not occurred, an abnormality relating to the engine 22 has occurred, and in this case, a determination is made as to whether or not the vehicle speed V input in step S100 is lower than a predetermined first determination vehicle speed V1 (step S200). Here, as is evident from a collinear diagram shown in FIG. 4, when the engine 22 is stopped suddenly by gate-blocking the inverter 41 for the motor MG1 or the like while the engine 22 is operative and the hybrid automobile 20 is traveling at a comparatively high vehicle speed V (see the dot-dash line in FIG. 4), the rotation speed Ne of the engine 22 may decrease more rapidly than the vehicle speed, while the respective rotation speeds Ns, Nm1 of the sun gear 31 of the power distribution integration mechanism 30 and the motor MG1 connected thereto may increase rapidly in an opposite direction (toward a negative side) to a previous direction. Note that in FIG. 4, a left side S axis indicates the rotation speed Ns of the sun gear 31, which matches the rotation speed Nm1 of the motor MG1, a central C axis indicates a rotation speed Nc of the carrier 34, which matches the rotation speed Ne of the engine 22, and a right side R axis indicates a rotation speed Nr of the ring gear 32, which is obtained by dividing the rotation speed Nm2 of the motor MG2 by the gear ratio Gr of the reduction gear 35.

Figure 5:
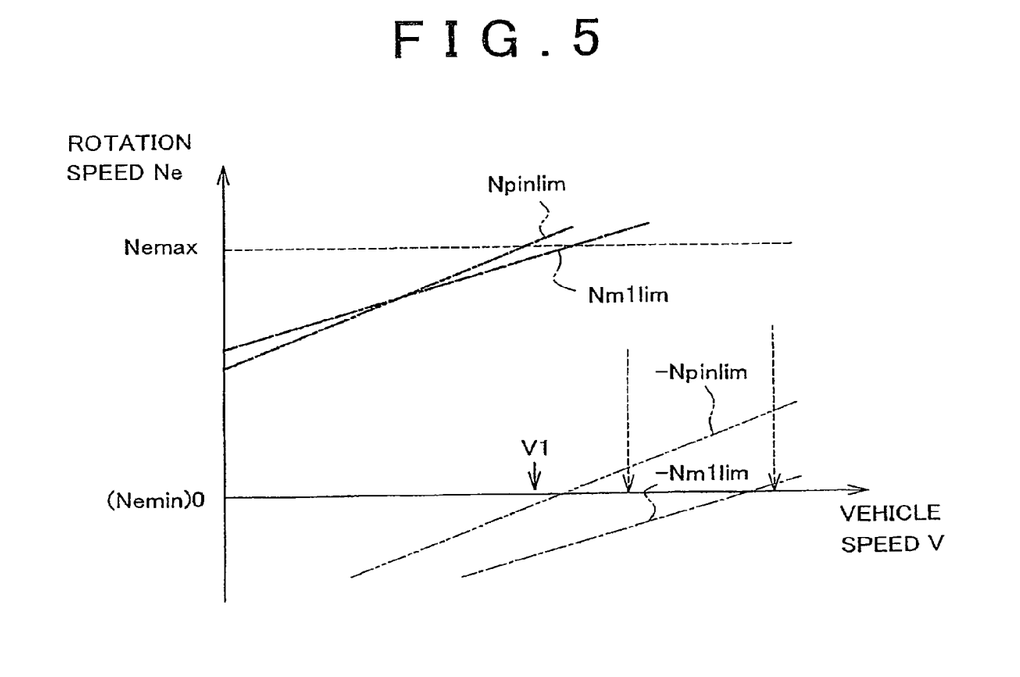
FIG. 5 is an illustrative view showing a relationship between a vehicle speed V and a rotation speed Ne of an engine when a rotation speed Nm1 of a motor MG1 matches a normal allowable rotation speed ±Nm1lim, and a relationship between the vehicle speed V and the rotation speed Ne of the engine when a rotation speed Npin of a pinion of the power distribution integration mechanism matches a normal allowable rotation speed ±Npinlim.

Further, FIG. 5 shows a relationship between the vehicle speed V and the rotation speed Ne of the engine 22 when the rotation speed Nm1 (Ns) of the motor MG1 (sun gear 31) matches a normal allowable rotation speed ±Nm1lim (see the dot-dash line in FIG. 5) and a relationship between the vehicle speed V and the rotation speed Ne of the engine 22 when a rotation speed Npin of the pinion 33 of the power distribution integration mechanism 30 matches a normal allowable rotation speed ±Npinlim (see the dot-dot-dash line in FIG. 5). In FIG. 5, when the rotation speed Ne of the engine 22 is between upper side dot-dash (Nm1lim) and dot-dot-dash lines (Npinlim) and lower side dot-dash (−Nm1lim) and dot-dot-dash lines (−Npinlim), this indicates that none of the motor MG1, the sun gear 31, and the pinion 33 exceeds the normal allowable rotation speed ±Nm1lim on either a positive side or a negative side. As is evident from FIG. 5, when the engine 22 is stopped suddenly while the engine 22 is operative and the hybrid automobile 20 is traveling at a comparatively high vehicle speed V, the rotation speed Ne of the engine 22 decreases rapidly, and in accordance with this variation in the rotation speed Ne of the engine 22, the rotation speed Npin of the pinion 33 of the power distribution integration mechanism 30 may exceed the normal allowable rotation speed −Npinlim on the negative side. Moreover, depending on the vehicle speed V, the rotation speed Nm1 (Ns) of the motor MG1 (sun gear 31) may exceed the normal allowable rotation speed −Nm1lim on the negative side (see the dotted line in the drawing).

Hence, in this embodiment, as shown in FIG. 5, the vehicle speed V at which the rotation speed Npin of the pinion 33 of the power distribution integration mechanism 30 and the rotation speed Nm1 (Ns) of the motor MG1 (sun gear 31) do not exceed the normal allowable rotation speed −Npinlim or −Nm1lim on the negative side even when the engine 22 is stopped suddenly (in this embodiment, a vehicle speed of approximately 90 to 100 km/h, for example) is determined in advance as the first determination vehicle speed V1, and in step S200, the vehicle speed V is compared with the first determination vehicle speed V1 to determine whether or not the pinion 33 of the power distribution integration mechanism 30 or the motor MG1 (sun gear 31) is likely to overspeed when the engine 22 is stopped suddenly at the start of the evasive travel control. When creating FIG. 5, the rotation speed Nm1 (Ns) of the motor MG1 (sun gear 31) may be obtained in accordance with a following Equation (3), which is derived from the collinear diagram in FIG. 4, and the rotation speed Npin of the pinion 33 of the power distribution integration mechanism 30 may be obtained in accordance with a following Equation (4).

$$Nm1 = Ne \times (1+\rho)/\rho - Nm2/(Gr \times \rho) \quad (3)$$

$$Npin = (Ne - Nm2/Gr) \times (\text{number of teeth of ring gear})/(\text{number of teeth of pinion}) \quad (4)$$

When it is determined in step S200 that the vehicle speed V is lower than the first determination vehicle speed V1, a determination is made as to whether or not a flag F, which is set at a value of 1 when the vehicle speed V equals or exceeds the first determination vehicle speed V1 at the start of the routine, is at a value of 0 (step S210). When the flag F is at a value of 0, a determination is made as to whether or not the rotation speed Nm1 of the motor MG1, input in step S100, equals or exceeds a predetermined rotation speed Nstop, which takes a positive value comparatively close to a value of 0, for example (step S240). When the rotation speed Nm1 of the motor MG1 equals or exceeds the predetermined rotation speed Nstop, a determination is made as to whether or not the input limit Win of the battery 50, input in step S100, is no greater than a limit value Winlim (a negative value) (step S250). When the input limit Win is no greater than the limit value Winlim and charging of the battery 50 is permitted, a target rotation speed Nm1* of the motor MG1 is set to decrease over time on the basis of the rotation speed of the motor MG1 input in step S100 and an elapsed time t from the initial affirmative determination in step S130 in order to halt rotation of the crankshaft 26, and the torque command Tm1* for the motor MG1 is set in accordance with a following Equation (5), which is based on the target rotation speed Nm1* and the current rotation speed Nm1 (step S260). Note that Equation (5) is a relational expression used in feedback control to rotate the motor MG1 at the target rotation speed Nm1*, and in Equation (5), "k1" of a first right side term is a gain of a proportional term while "k2" of a second right side term is a gain of an integral term. Once the torque command Tm1* for the motor MG1 has been set in this manner, the processing in steps S160 to S190 is executed, whereupon the processing in step S100 onward is executed again. Upon reception of the torque commands Tm1*, Tm2*, the motor ECU 40 performs switching control on the switching elements of the inverters 41, 42 such that the motor MG1 is driven in accordance with the torque command Tm1* and the motor MG2 is driven in accordance with the torque command Tm2*.

$$Tm1^* = k1 \times (Nm1^* - Nm1) + k2 \times \int (Nm1^* - Nm1) dt \quad (5)$$

Hence, in the hybrid automobile 20 according to this embodiment, the motors MG1 and MG2 can be operated normally even when an abnormality relating to the engine 22 is determined to have occurred, and in a case where the vehicle speed V is lower than the first determination vehicle speed V1 at the start of the routine, rotation of the crankshaft 26 of the engine 22 is stopped using torque output from the motor MG1. At this time, the motor MG1 executes power generation by outputting negative torque to the sun gear 31, and the power generated by the motor MG1 while halting rotation of the crankshaft 26 can be used to charge the battery 50 or added to torque output from the motor MG2, while the negative torque from the motor MG1 can be reversed by the power distribution integration mechanism 30 and output to the ring gear shaft 32a as positive traveling torque. Thus, travel using power from the motor MG2 can be continued as far as possible. Note that when the rotation speed Nm1 of the motor MG1 is determined to be lower than the predetermined rotation speed Nstop in step S240 following execution of the processing in step S260, the processing in steps S140 to S190 is executed. The processing in steps S140 to S190 is also executed when the input limit Win of the battery 50 is determined to exceed the limit value Winlim despite affirmative determinations in steps S200, S210 and S240, or in other words when charging of the battery 50 is not permitted.

On the other hand, when the vehicle speed V input in step S200 is determined to equal or exceed the first determination vehicle speed V1 after determining that the abnormality diagnosis flag Fdm1 is at a value of 0 in step S130, the pinion 33 of the power distribution integration mechanism 30 and the motor MG1 (sun gear 31) may overspeed due to sudden stoppage of the engine 22 at the start of the evasive travel control, as described above. Hence, in the hybrid automobile 20 according to this embodiment, when the vehicle speed V is determined to equal or exceed the first determination vehicle speed V1 in step S200, a rapid rotation speed reduction (rotation speed variation) in the engine 22 from a high vehicle speed state is suppressed by motoring the engine 22 using the motor MG1, which can be operated normally, so that the rotation speed Ne of the crankshaft 26 is maintained at a somewhat high level.

Figure 6:
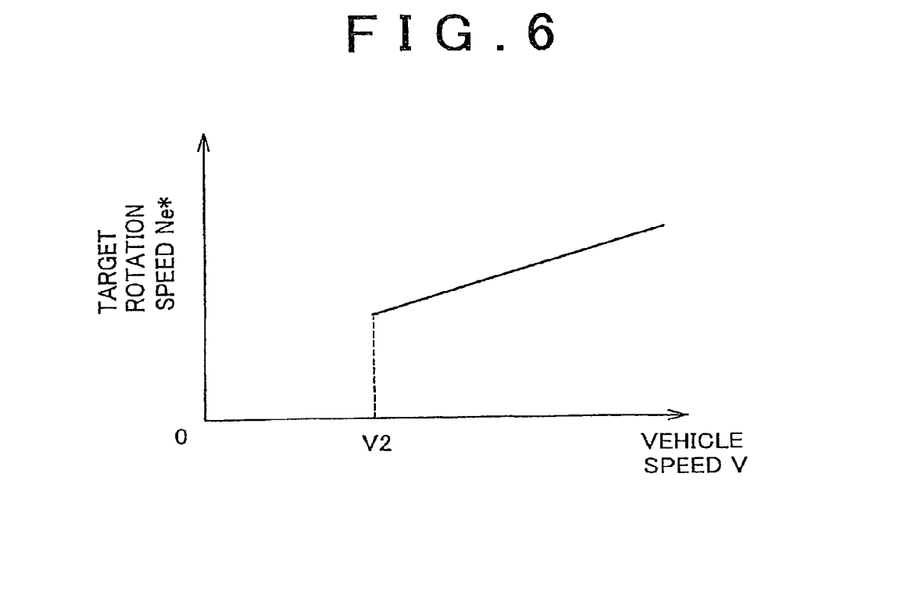
FIG. 6 is an illustrative view showing an example of a target rotation speed setting map used in this embodiment.

More specifically, when it is determined in step S200 that the vehicle speed V equals or exceeds the first determination vehicle speed V1, the aforementioned flag F is set at a value of 1 (step S270), whereupon a target rotation speed Ne* of the crankshaft 26 for motoring the engine 22 is set on the basis of the vehicle speed V input in step S100 (step S280). In this embodiment, an evasive travel target rotation speed setting map defining a relationship between the vehicle speed V and the target rotation speed Ne* is prepared in advance and stored in the ROM 74, and a value corresponding to the given vehicle speed V is derived from the map and set as the target rotation speed Ne*: FIG. 6 shows an example of the target rotation speed setting map. As shown in FIG. 6, the target rotation speed setting map according to this embodiment is created to define the target rotation speed Ne* relative to each vehicle speed V to be as low as possible overall and to decrease steadily as the vehicle speed V decreases so that the amount of power consumed during motoring is as small as possible while remaining within a range in which overspeeding does not occur in the pinion 33 and the motor MG1 (sun gear 31) in relation to the vehicle speed V (rotation speed Nm2/Gr). Next, the target rotation speed Ne*, the rotation speed Nr (Nm2/Gr) of the ring gear shaft 32a, which is commensurate with the vehicle speed V, and the gear ratio ρ (the number of teeth of the sun gear 31/the number of teeth of the ring gear 32) of the power distribution integration mechanism 30 are used to calculate the target rotation speed Nm1* of the motor MG1 in accordance with a following Equation (6), whereupon the torque command Tm1* for the motor MG1 is set in accordance with Equation (5), which is based on the calculated target rotation speed Nm1* and the current rotation speed Nm1 (step S290). The processing in steps S160 to S190 is then executed, whereupon the processing in step S100 onward is executed again. In this case also, upon reception of the torque commands Tm1*, Tm2* transmitted by the hybrid ECU 70 in step S190, the motor ECU 40 performs switching control on the switching elements of the inverters 41, 42 such that the motor MG1 is drive in accordance with the torque command Tm1* and the motor MG2 is driven in accordance with the torque command Tm2*. As a result, the motors MG1 and MG2 are controlled such that the engine 22 is motored by the motor MG1, thereby causing the crankshaft 26 to rotate at the target rotation speed Ne*, and traveling torque is output to the ring gear shaft 32a from the motor MG2.

$$Nm1^* = Ne^* \times (1+\rho)/\rho - Nm2/(Gr \times \rho) \quad (6)$$

When the processing in step S100 onward is executed again and the vehicle speed V is determined to equal or exceed the first determination vehicle speed V1 in step S200, the processing in steps S270 to S290 and S160 to S190 is executed again. Further, when the vehicle speed V is determined to be lower than the first determination vehicle speed V1 in step S200 following execution of the processing in steps S270 and so on, the flag F is determined to be at a value of 1 in step S210, and in this case, a determination is made as to whether or not the vehicle speed V input in step S100 is equal to or lower than a predetermined second determination vehicle speed (motoring cancellation vehicle speed) V2 (step S220). The upper limit value of the vehicle speed during the evasive motor travel control (a vehicle speed of approximately 30 to 40 km/h in this embodiment, for example) may be employed as the second determination vehicle speed V2 used in step S220, for example. When it is determined in step S220 that the vehicle speed V equals or exceeds the second determination vehicle speed V2, the processing in steps S280, S290, and S160 to S190 is executed. When it is determined in step S220 that the vehicle speed V is lower than the second determination vehicle speed V2, the flag F is set at a value of 0 (step S230) and the processing in steps S260 and S160 to S190 is executed such that rotation of the crankshaft 26 of the engine 22 is stopped by the torque output from the motor MG1. When the rotation speed Nm1 of the motor MG1 is determined to be lower than the predetermined rotation speed Nstop in step S240 following execution in S260, the processing in steps S140 to S190 is repeated.

As described above, in the hybrid automobile 20 according to this embodiment, in a case where the vehicle speed V obtained by the vehicle speed sensor 87 is lower than the first determination vehicle speed V1 when an internal combustion engine-related abnormality has occurred, or in other words when the hybrid ECU 70 determines that an abnormality relating to the motors MG1 and MG2 has not occurred but an abnormality relating to the engine 22 has occurred while the engine 22 is operative, the engine 22 is stopped by gate-blocking the inverter 41 or by negative torque output from the motor MG1, and the motor MG2 and so on are controlled such that traveling torque is output to the ring gear shaft 32a from the motor MG2 (normal evasive electric travel control). In a case where the vehicle speed V obtained by the vehicle speed sensor 87 equals or exceeds the first determination vehicle speed V1 when an internal combustion engine-related abnormality has occurred, on the other hand, the motors MG1 and MG2 are controlled such that traveling torque is output to the ring gear shaft 32a from the motor MG2 while the engine 22 is motored by the motor MG1 such that the crankshaft 26 rotates at the target rotation speed Ne* until the vehicle speed V subsequently falls to or below the second determination vehicle speed V2 (high vehicle speed evasive electric travel control).

In other words, when an abnormality relating to the engine 22 occurs, the rotation speed Ne of the engine 22 can be controlled by operating the motor MG1 normally as long as an abnormality relating to the motors MG1 and MG2 has not occurred. Furthermore, by motoring the engine 22 using the motor MG1 such that the crankshaft 26 rotates at the target rotation speed Ne* in a case where the vehicle speed V equals or exceeds the first determination vehicle speed V1 when an internal combustion engine-related abnormality has occurred, a rapid rotation speed reduction (rotation speed variation) in the engine 22 from a high vehicle speed state can be suppressed, and therefore problems in the power distribution integration mechanism 30 and so on caused by rapid variation in the rotation speed Ne of the engine 22, a rapid increase to a reverse rotation side in the rotation speeds Ns, Nm1 of the sun gear 31 of the power distribution integration mechanism 30 and the motor MG1 connected thereto, and so on can be suppressed favorably. Hence, in the hybrid automobile 20 according to this embodiment, when an abnormality relating to the engine 22 occurs, the hybrid automobile 20 can be allowed to continue traveling while suppressing secondary malfunctions.

Further, by setting the target rotation speed Ne* for use during motoring of the engine 22 in accordance with the vehicle speed V obtained by the vehicle speed sensor 87 so as to decrease steadily as the vehicle speed V decreases, the engine 22 can be motored such that rapid reductions in the rotation speed of the crankshaft 26 are suppressed and the amount of power consumed by the motor MG1 during the motoring can be reduced. Note, however, that instead of varying the target rotation speed Ne* in accordance with the vehicle speed V, a fixed value (a value of approximately 3000 rpm, for example) may be used as the target rotation speed Ne*. Furthermore, once the vehicle speed V of the hybrid automobile 20 has decreased to a certain extent due to execution of the high vehicle speed evasive electric travel control, the reduction rate (variation rate) of the rotation speed Ne of the crankshaft 26 decreases and the likelihood of the rotation speeds Ns, Nm1 of the sun gear 31 of the power distribution integration mechanism 30 and the motor MG1 connected thereto increasing rapidly to the reverse rotation side decreases, even when motoring of the engine 22 is stopped. Hence, by halting motoring of the engine 22 when the vehicle speed V falls to or below the second determination vehicle speed V2 serving as the motoring cancellation vehicle speed after the start of the high vehicle speed evasive electric travel control, the power that is consumed by the motor MG1 during the motoring can be eliminated, and travel using torque from the motor MG2 can be continued as far as possible.

Moreover, in the hybrid automobile 20 according to this embodiment, when the vehicle speed V falls to or below the second determination vehicle speed V2 serving as the motoring cancellation vehicle speed after the start of the high vehicle speed evasive electric travel control, negative torque is output to the crankshaft 26 of the engine 22 from the motor MG1 to halt rotation of the crankshaft 26. Hence, power generated by the motor MG1 while halting rotation of the crankshaft 26 can be used to charge the battery 50 or added to the torque output of the motor MG2, while the negative torque from the motor MG1 can be reversed by the power distribution integration mechanism 30 and output to the ring gear shaft 32a as positive traveling torque. Thus, travel using torque from the motor MG2 can be continued as far as possible. Note, however, that once the vehicle speed V has fallen to or below the second determination vehicle speed V2 after the start of the high vehicle speed evasive electric travel control, the engine 22 may be stopped by gate-blocking the inverter 41 for the motor MG1. Further, in the hybrid automobile 20 according to this embodiment, rotation of the crankshaft 26 of the engine 22 is also stopped by outputting negative torque to the crankshaft 26 from the motor MG1 when the vehicle speed V obtained by the vehicle speed sensor 87 is lower than the first determination vehicle speed V1 at a time of occurrence of an internal combustion engine-related abnormality. However, this operation may be omitted.

Furthermore, in this embodiment, a single pinion planetary gear mechanism including the sun gear 31 connected to the rotary shaft of the motor MG1, the ring gear 32 connected to the ring gear shaft 32a serving as a drive shaft, and the carrier 34 that holds the plurality of pinions 33 that mesh with both the sun gear 31 and the ring gear 32 and is connected to the crankshaft 26 of the engine 22 is employed as the power distribution integration mechanism 30. In the hybrid automobile 20 including this type of single pinion planetary gear mechanism, the rotation speed Npin of the pinions 33 held by the carrier 34 is commensurate with the difference between the rotation speed Nc of the carrier 34, which matches the rotation speed Ne of the engine 22, and the rotation speed Nr (Nm2/Gr) of the ring gear 32, which is commensurate with the vehicle speed V (see Equation (4)). Hence, with the hybrid automobile 20 according to this embodiment, by motoring the engine 22 using the motor MG1 such that the crankshaft 26 rotates at the target rotation speed Ne* when the vehicle speed V equals or exceeds the first determination vehicle speed V1 at a time of occurrence of an internal combustion engine-related abnormality, overspeeding of the pinions 33 caused by a rapid rotation speed reduction (rotation speed variation) in the engine 22 from a high vehicle speed state can be suppressed, and as a result, problems in the power distribution integration mechanism 30 and so on caused by overspeeding of the pinions 33 can be suppressed favorably.

Figure 7:
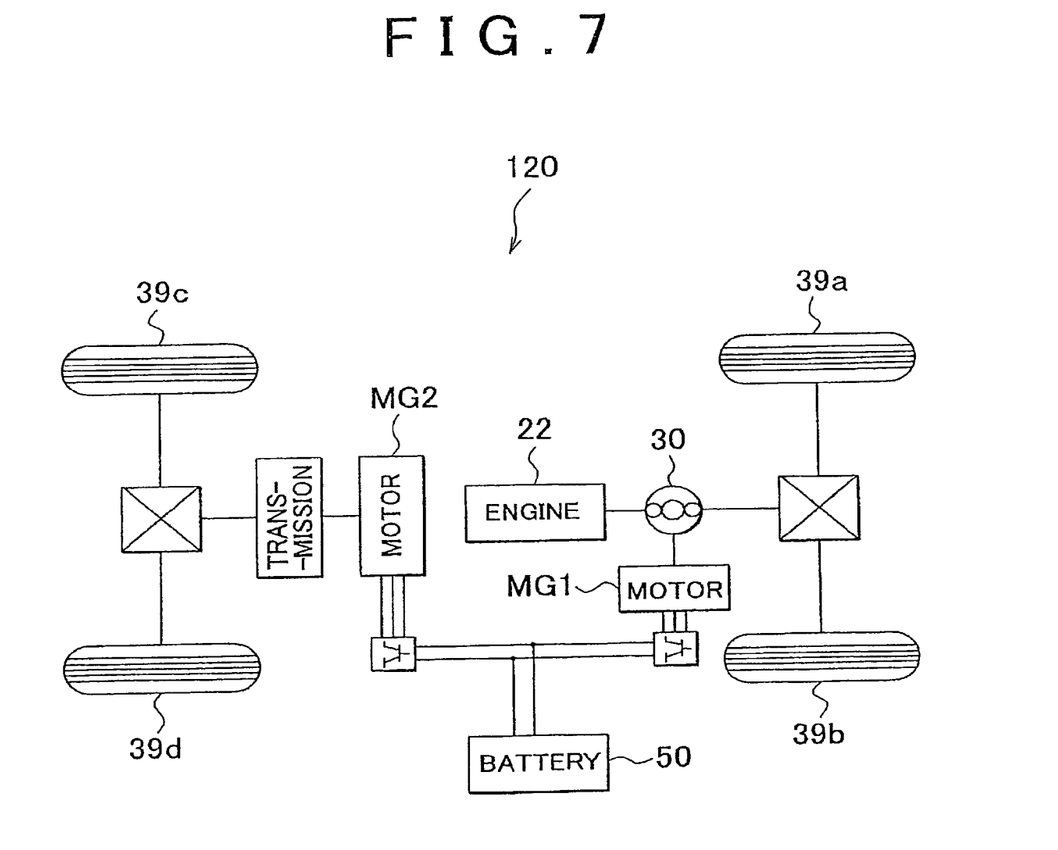
FIG. 7 is a schematic diagram showing a hybrid automobile according to a modified example of this embodiment.

Note that in the hybrid automobile 20 according to this embodiment, the ring gear shaft 32a serving as a drive shaft and the motor MG2 are coupled via the reduction gear 35, but instead of the reduction gear 35, a transmission having two shift positions, namely Hi and Lo, or three or more gear positions, for example, which shifts the rotation speed of the motor MG2 and transmits the shifted rotation speed to the ring gear shaft 32a may be employed. Furthermore, in the hybrid automobile 20 according to this embodiment, the power of the motor MG2 is output to the ring gear shaft 32a after being reduced by the reduction gear 35, but the scope of application of the invention is not limited to this constitution. More specifically, the invention may be applied to a hybrid automobile 120 shown in FIG. 7 as a modified example, in which the power of the motor MG2 is output to a different axle (an axle connected to vehicle wheels 39c, 39d in FIG. 7) to an axle (an axle connected to the vehicle wheels 39a, 39b) connected to the ring gear shaft 32a.

Here, relationships between the principal elements of the embodiment and modified example described above and the principal elements of the invention will be described. In the embodiment and modified example, the engine 22 corresponds to an example of an "internal combustion engine", the motor MG1 corresponds to an example of a "first motor", the power distribution integration mechanism 30, which is a single pinion planetary gear mechanism including the sun gear 31 connected to the motor MG1, the carrier 34 connected to the crankshaft 26 of the engine 22, and the ring gear 32 connected to the ring gear shaft 32a serving as a drive shaft, wherein the carrier 34 is positioned between the sun gear 31 and the ring gear 32 on a collinear diagram and these three elements are capable of mutual differential rotation, corresponds to an example of a "planetary gear mechanism", the motor MG2 corresponds to an example of a "second motor", the battery 50 corresponds to an example of a "storage device", the hybrid ECU 70, which determines the presence of an abnormality relating to the engine 22 on the basis of data indicating the operational state of the engine 22 and the operational states of various sensors, accessories, and so on, obtained from the engine ECU 24, and determines the presence of an abnormality relating to the motor MG1 and the motor MG2 on the basis of data indicating the operational states of the motors MG1, MG2, the inverters 41, 42, various sensors, and so on, corresponds to an example of an "abnormality determination device", the vehicle speed sensor 87 corresponds to an example of a "vehicle speed acquisition device", and a combination of the hybrid ECU 70 and the motor ECU 40, which executes the processing in steps S140 to S190 or the processing in steps S260 and S160 to S190 in FIG. 2B when the vehicle speed V is lower than the first determination vehicle speed V1 at a time of occurrence of an internal combustion engine-related abnormality and executes the processing in steps S280, S290 and S160 to S190 in FIG. 2A and FIG. 2B until an affirmative determination is made in step S220 when the vehicle speed V equals or exceeds the first determination vehicle speed V1 at a time of occurrence of an internal combustion engine-related abnormality, corresponds to an example of a "controller".

Note that the "internal combustion engine" is not limited to the engine 22, which outputs power upon reception of a supply of hydrocarbon-based fuel such as gasoline or light oil, and another type of engine, such as a hydrogen engine, may be used. The "first motor" and "second motor" are not limited to synchronous generator-motors such as the motors MG1, MG2, and another type of motor, such as an induction motor, may be used. As regards the "planetary gear mechanism", another type of planetary gear mechanism such as a double pinion planetary gear mechanism may be used as long as it includes a first element connected to a rotary shaft of the first motor, a second element connected to an engine shaft of the internal combustion engine, and a third element connected to a drive shaft that transmits power to a drive wheel, and the second element is positioned between the first element and the third element on a collinear diagram. The "storage device" is not limited to a secondary battery such as the battery 50, and another type of storage device such as a capacitor may be used. As regards the "abnormality determination device", a device other than the hybrid ECU 70 may be used as long as it is capable of determining the presence of an abnormality relating to the internal combustion engine and determining the presence of an abnormality relating to the first motor and an abnormality relating to the second motor. As regards the "vehicle speed acquisition device", a device other than the vehicle speed sensor 87 may be used as long as it is capable of measuring or estimating (calculating) the vehicle speed. As regards the "controller", a device other than the combination of the hybrid ECU 70 and the motor ECU 40, such as a single ECU, may be used as long as it executes normal evasive electric travel control, in which traveling power is output to the drive shaft from the second motor while the internal combustion engine is halted, when the vehicle speed obtained by the vehicle speed acquisition device is lower than a predetermined vehicle speed at a time of occurrence of an internal combustion engine-related abnormality and executes high vehicle speed evasive electric travel control, in which traveling power is output to the drive shaft from the second motor while the internal combustion engine is motored by the first motor such that the engine shaft rotates at a predetermined target rotation speed until a predetermined cancellation condition is established, when the vehicle speed obtained by the vehicle speed acquisition device equals or exceeds the predetermined vehicle speed at a time of occurrence of an internal combustion engine-related abnormality. All of these relationships between the principal elements of the embodiment and modified example and the principal elements of the invention are examples that specifically illustrate the best modes for carrying out the invention, and do not therefore limit the elements of the invention. In other words, the embodiment is merely one specific example of the invention.

An embodiment of the invention was described above, but the invention is not limited in any way to the above embodiment, and may of course be subjected to various modifications within a scope that does not depart from the spirit of the invention.

Note that the invention may be used in the hybrid vehicle manufacturing industry and so on.

What is claimed is:

1. A hybrid vehicle comprising:
   an internal combustion engine;
   a first motor that inputs and outputs power;
   a planetary gear mechanism that includes a first element connected to a rotary shaft of the first motor, a second element connected to an engine shaft of the internal combustion engine, and a third element connected to a drive shaft that transmits power to a drive wheel, the second element being positioned between the first element and the third element on a collinear diagram and the three elements being capable of mutual differential rotation;
   a second motor that outputs power to the drive shaft;
   a storage device that exchanges power with the first and second motors;
   an abnormality determination device that determines presence of an abnormality relating to the internal combustion engine and determines presence of an abnormality relating to the first motor and presence of an abnormality relating to the second motor;
   a vehicle speed acquisition device that obtains a vehicle speed; and
   a controller that executes a normal evasive electric travel control, in which a traveling power is output to the drive shaft from the second motor while the internal combustion engine is halted, when the vehicle speed obtained by the vehicle speed acquisition device is lower than a predetermined vehicle speed at a time of occurrence of an internal combustion engine-related abnormality, which is when the abnormality determination device determines that an abnormality relating to the first and second motors has not occurred but an abnormality relating to the internal combustion engine has occurred while the internal combustion engine is operative, and executes a high vehicle speed evasive electric travel control, in which the traveling power is output to the drive shaft from the second motor while the internal combustion engine is motored by the first motor such that the engine shaft rotates at a predetermined target rotation speed until a predetermined cancellation condition is established, when the vehicle speed obtained by the vehicle speed acquisition device equals or exceeds the predetermined vehicle speed at a time of occurrence of an internal combustion engine-related abnormality.

2. The hybrid vehicle according to claim 1, wherein the target rotation speed is set in accordance with the vehicle speed obtained by the vehicle speed acquisition device to decrease steadily as the obtained vehicle speed decreases.

3. The hybrid vehicle according to claim 1, wherein the cancellation condition is established when the vehicle speed obtained by the vehicle speed acquisition device falls to or below a predetermined motoring cancellation vehicle speed which is lower than the predetermined vehicle speed.

4. The hybrid vehicle according to claim 1, wherein, when the cancellation condition is established, the controller causes the first motor to output a negative power to the engine shaft of the internal combustion engine to stop rotation of the engine shaft.

5. The hybrid vehicle according to claim 1, wherein the planetary gear mechanism is a single pinion planetary gear mechanism having a sun gear connected to the rotary shaft of the first motor, a ring gear connected to the drive shaft, and a carrier that holds a plurality of pinions that mesh with both the sun gear and the ring gear and is connected to the engine shaft of the internal combustion engine.

6. A control method for a hybrid vehicle that includes an internal combustion engine, a first motor capable of inputting and outputting power, a planetary gear mechanism that includes a first element connected to a rotary shaft of the first motor, a second element connected to an engine shaft of the internal combustion engine, and a third element connected to a drive shaft that transmits power to a drive wheel, the second element being positioned between the first element and the third element on a collinear diagram and the three elements being capable of mutual differential rotation, a second motor capable of outputting power to the drive shaft, and a storage device capable of exchanging power with the first and second motors, the method comprising:

(a) a step of determining presence of an abnormality relating to the internal combustion engine and determining presence of an abnormality relating to the first motor and presence of an abnormality relating to the second motor; and (b) a step of executing a normal evasive electric travel control, in which a traveling power is output to the drive shaft from the second motor while the internal combustion engine is halted, when a vehicle speed is lower than a predetermined vehicle speed at a time of occurrence of an internal combustion engine-related abnormality, which is when the determinations of the step (a) indicate that an abnormality relating to the first and second motors has not occurred but an abnormality relating to the internal combustion engine has occurred while the internal combustion engine is operative, and executing a high vehicle speed evasive electric travel control, in which the traveling power is output, to the drive shaft from the second motor while the internal combustion engine is motored by the first motor such that the engine shaft rotates at a predetermined target rotation speed until a predetermined cancellation condition is established, when the vehicle speed equals or exceeds the predetermined vehicle speed at a time of occurrence of an internal combustion engine-related abnormality.

7. The control method according to claim 6, wherein the hybrid vehicle further has a vehicle speed acquisition device, and the target rotation speed is set in accordance with the vehicle speed obtained by the vehicle speed acquisition device to decrease steadily as the obtained vehicle speed decreases.

8. The control method according to claim 6, wherein the hybrid vehicle further has a vehicle speed acquisition device, and the cancellation condition is established when the vehicle speed obtained by the vehicle speed acquisition device falls to or below a predetermined motoring cancellation vehicle speed which is lower than the predetermined vehicle speed.

9. The control method according to claim 6, further comprising a step of causing the first motor to output a negative power to the engine shaft of the internal combustion engine to stop rotation of the engine shaft when the cancellation condition is established.

* * * * *